United States Patent
Phelon

[11] 3,727,302
[45] Apr. 17, 1973

[54] METHOD OF MAKING AN ANNULAR ASSEMBLY OF MAGNETS FOR USE AS THE FIELD OF A DYNAMOELECTRIC MACHINE

[75] Inventor: Russell E. Phelon, Rio Piedras, P.R.

[73] Assignee: R. E. Phelon Company, Inc., East Longmeadow, Mass.

[22] Filed: Jan. 6, 1972

[21] Appl. No.: 215,828

Related U.S. Application Data

[62] Division of Ser. No. 60,296, Aug. 3, 1970, Pat. No. 3,663,050.

[52] U.S. Cl. .......................29/596, 29/522, 29/598, 29/607
[51] Int. Cl....H02k 15/00, H02k 15/14, H02k 15/16
[58] Field of Search......................29/596, 598, 607, 29/522; 310/42, 153, 154, 155, 156, 216, 218, 261

[56] References Cited

UNITED STATES PATENTS

| | | |
|---|---|---|
| 3,258,622 | 6/1966 | Gillespie..............................310/154 |
| 3,091,713 | 5/1963 | Latta....................................310/154 |
| 3,131,462 | 5/1964 | Owings et al..........................29/596 |
| 3,213,303 | 10/1965 | Riley, Jr. et al................310/154 UX |
| 3,258,623 | 6/1966 | Phelon et al.......................310/153 X |
| 3,290,525 | 12/1966 | Sudmeier ............................310/153 |

Primary Examiner—Charles W. Lanham
Assistant Examiner—Carl E. Hall
Attorney—Donald K. Huber

[57] ABSTRACT

A method of assembling a plurality of arcuate magnets inside an annular member wherein said magnets are biased towards each other by a resilient member.

A plurality of arcuate ceramic magnets are arranged in a generally end face to end face, spaced relationship to form an annular ring, and a compressible resilient spacer or spring member is placed between two magnets to hold them in assembly with a temporary shipping band or with the rotor part in which they are finally installed. In making the assembly, a deformable insert may also be placed between two adjacent magnets and then deformed to enlarge the gap in which it is received, thereby compressing the spring member. If the magnets are first formed into a preassembly with a shipping band for later assembly with a rotor part, and if a deformable insert is used to control the compression of the spring member, the deformable insert in forming the preassembly is preferably deformed only to a degree sufficient to hold the preassembly in assembly with only a degree of tightness sufficient to withstand normal handling, and after the magnets are inserted in the final rotor part and the shipping band removed, the deformable insert is deformed to a further extent to hold the magnets in assembly with the rotor part with a greater degree of tightness.

11 Claims, 30 Drawing Figures

PATENTED APR 17 1973 3,727,302

METHOD OF MAKING AN ANNULAR ASSEMBLY OF MAGNETS FOR USE AS THE FIELD OF A DYNAMOELECTRIC MACHINE

CROSS-REFERENCE TO RELATED APPLICATION

This application is a division of copending application Ser. No. 60,296, filed Aug. 3, 1970 now U.S. Pat. No. 3,63,050, issued May 16, 1972.

BACKGROUND OF THE INVENTION

This invention relates to dynamoelectric machines using permanently magnetized material for establishing a magnetic field, and deals more particularly with the method of making an annular assembly of magnets to be used as such a field, such method including the installation of the magnets in and the securement of them to a flywheel or other annular carrier.

In its broader aspects, the method of this invention may be used with various different types of dynamoelectric machines, such as motors or generators, using permanent magnet material for establishing a magnetic field, and may be used with such machines wherein the magnetic field means is either a rotating part or a stationary part. At present, however, the invention finds particular utility in application to electric alternators for use with internal combustion engines wherein the magnetic field means consists of a magnet ring installed in the flywheel of the engine for cooperation with a stator located within the flywheel. Accordingly, in the description which follows, and in the drawings forming a part hereof, the invention is described in connection with various different constructions of flywheel alternators, but it should be understood that the invention is not in its broader aspects necessarily limited to this application.

The general use of an annular magnet assembly in combination with a flywheel or other annular carrier is well known in the prior art. U.S. Pat. No. 3,132,270, for example, discloses a rotor annulus construction for use in an alternator. That annulus includes a series of magnets and pole pieces which are first formed into a self-sustaining unit which unit is then placed into a die cavity and material used in the flywheel is subsequently cast therearound. The magnets are tangentially charged and the pole pieces are used to provide pole faces on the interior surface of the flywheel rim and to provide flux-conducting paths between the pole faces and the magnets. In making the self-sustaining unit the magnets and the pole pieces are assembled inside of a surrounding band and are then spread into tight engagement with the band by inserting a wedge member or shim between a magnet and a pole piece.

Recently, it has become known to use ceramic permanent magnets in various dynamoelectric machines. These are magnets made of a hard ferrite, such as barium ferrite, strontium ferrite or lead ferrite. Because of their magnetic properties these magnets may be radially charged without requiring a great radial thickness and may themselves provide pole faces, thereby eliminating the need for associated pole shoes or pole pieces. In fact, it has been found that an improved wave-shape of alternator output voltage is obtained when pole shoes are not incorporated in the alternator construction. In such an alternator, the output voltage is more closely sinusoidal than in constructions using pole shoes. It is believed that this is because when using pole shoes, on a rotor for example, the entire flux of a permanent magnet tends to flow through its associated shoe when such shoe becomes only slightly overlapped with a stator pole, thereby rapidly changing the flux at the initiation of the overlap and possibly producing undesired voltage spikes in the output waveform, whereas with ceramic magnets providing their own pole faces this does not occur since the ceramic material has a high reluctance in a direction parallel to the plane of the pole face.

Besides improving the output voltage wave-shape the use of ceramic magnets also enables a reduction in cost by eliminating the cost of pole shoes or pole pieces. Also, and as part of this invention, the individual pieces of ceramic magnet material may be made of relatively large circumferential extent and charged to provide a number of circumferentially spaced magnetic poles on each such piece of magnet material. This has the advantage of further reducing the cost of the completed magnet ring and of increasing its versatility. That is, it may be charged to provide various different numbers of magnetic poles, thereby when used as a generator rotor enabling it to be used with stators having different numbers of stator poles and/or producing different types of outputs, such as single-phase, two-phase or three-phase outputs.

Ceramic permanent magnets have a tendency to crack or chip if stressed to too high a compressive force. One object of this invention is to provide a magnet annulus method of assembly whereby the load imposed on the magnets is controllable so as to assure the maintenance of such load well below that causing cracking or other failure of the magnets.

BRIEF DESCRIPTION OF THE DRAWINGS

Details of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
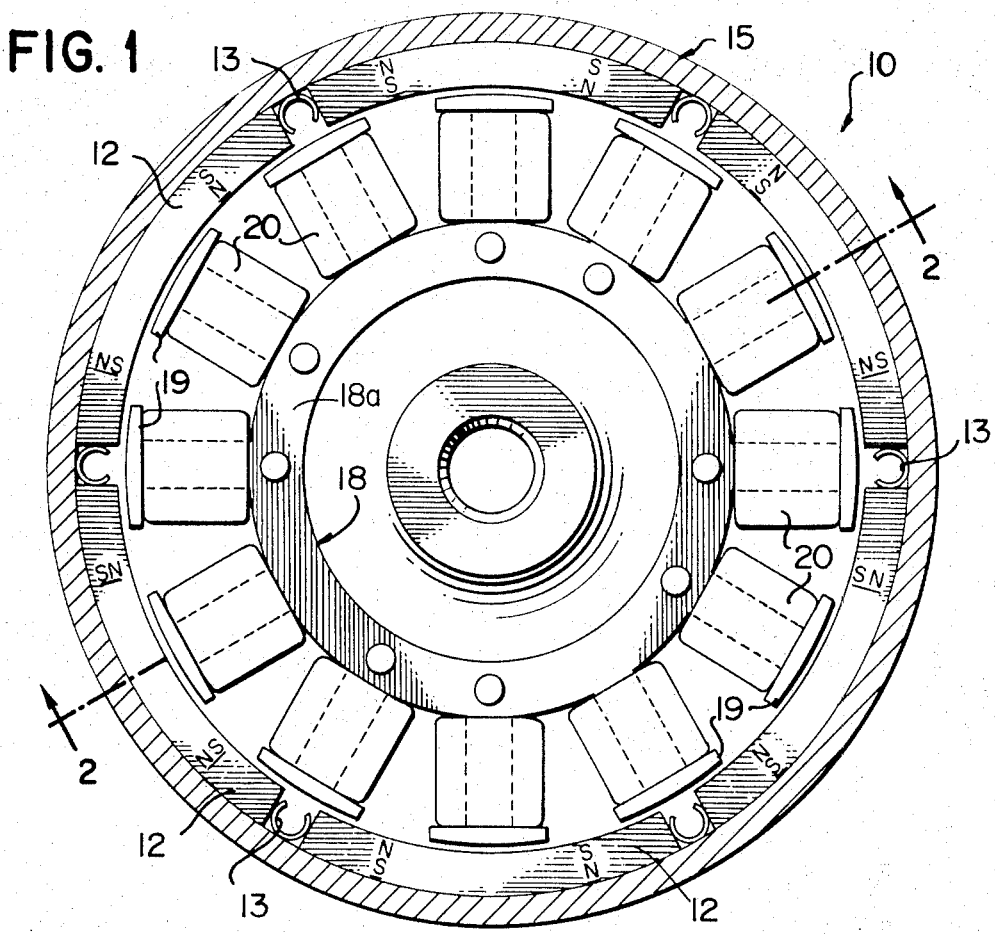
FIG. 1 is a view, taken on the line 1—1 of FIG. 2, showing a flywheel alternator using a magnet assembly made in accordance with this invention.
Figure 2:
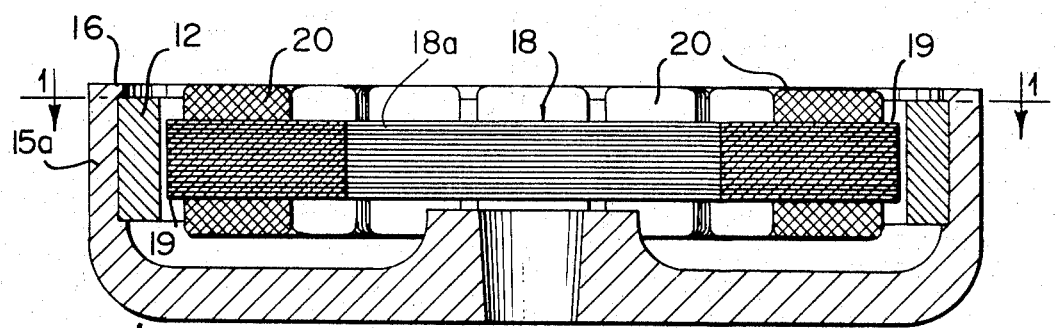
FIG. 2 is a sectional view taken on the line 2—2 of FIG. 1.

Turning first to FIGS. 1 and 2, these figures illustrate a flywheel alternator, indicated generally at 10, including a magnetic field means made in accordance with the present invention. The alternator 10 includes a stator 18 and a flywheel 15 adapted for connection to the crankshaft or the like of an engine and having a retaining rim portion 15a within which is located the magnetic field means in the form of a magnet assembly comprised of an annular arrangement or series of arcuate permanent magnets 12, 12 and interposed spring elements 13, 13. The rim portion 15a is of magnetic material and provides a magnetic path for connecting the magnets 12, 12. The arcuate magnets 12, 12 are arranged generally in an end face to end face, circumferentially spaced relationship to form an annular ring having circumferentially extending gaps between adjacent magnets, and a spring element 13 is located in each of the gaps. The stator 18 comprises a core 18a made of a plurality of radially outwardly extending stator poles 19, 19. A generating winding 20 is located on each of the stator poles 19, 19.

The magnets 12, 12 are made of a high coercive force ceramic permanent magnet material, such as barium ferrite, strontium ferrite or lead ferrite, of the oriented type, and are magnetized to form their magnetic poles after being placed in the flywheel rim 15a. Preferably, and in accordance with one aspect of this invention, they are of such a circumferential length that more than one magnetic pole may be formed on each of their radially inner faces for cooperation with the stator poles 19, 19. As shown in FIG. 1, the stator 18 includes twelve poles 19, 19 and the rotor includes six magnets 12, 12 each magnetized to provide two magnetic poles on its inner face for a total of twelve poles for the entire rotor, the alternator 10 therefore being adapted to provide a single-phase output. The magnets 12, 12 are radially charged or magnetized so that each magnetic pole on the inner face of a magnet has a corresponding pole of opposite magnetic polarity located radially outwardly thereof on the outer face of the magnet. The magnetized zones of the magnets are also so magnetized that the poles on the inner faces of the magnets are of alternate magnetic polarity in going around the circle defined by such inner faces, and likewise the magnetic poles formed on the outer faces of the magnets are of similar alternate magnetic polarity, the flywheel rim 15a being of a magnetic material so as to form a low reluctance flux path for the flow of flux between adjacent ones of the magnetic poles on the outer faces of the magnets.

The same rotor as shown in FIG. 1, with its magnets similarly magnetized to provide twelve rotor poles, could also be used with an eighteen pole stator to provide a three-phase output. It could also be magnetized to provide three magnetic poles on each magnet, for a total of eighteen rotor poles, and used with an eighteen pole stator for a single-phase output, or with a twenty-seven pole stator for a three-phase output. Therefore, the same physical construction of a rotor may be used without change, except possibly for the magnetization of its magnets, with various different stators to provide various different types of outputs.

Figure 3:
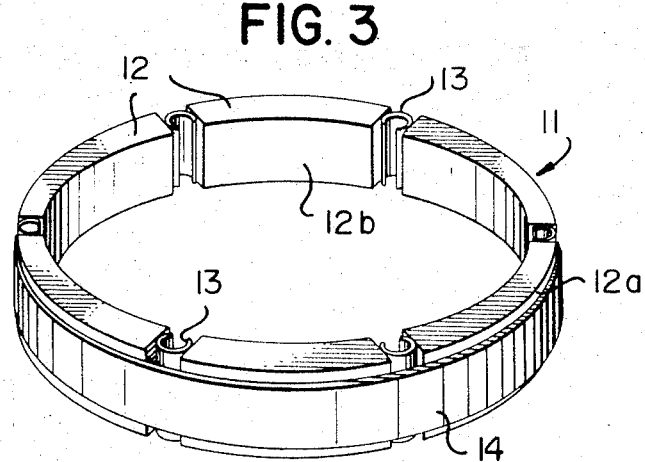
FIG. 3 is a perspective view of a magnet preassembly used in making the rotor of FIG. 1.

One feature of this invention is directed to the manner in which the magnets are assembled with the flywheel or other carrier to form a rotor. More particularly, the method of assembly makes use of a preassembly of magnets, inserts and a surrounding band. The preassembly used in making the rotor in the flywheel 15 of FIG. 1 is shown in FIG. 3 and indicated generally at 11. It includes a plurality of permanent magnets 12, 12 arranged in a generally end face to end face, spaced relationship to form an annular ring having gaps as shown between adjacent magnets 12, 12. A spring member or insert 13 is disposed in each of the gaps, and a circular band 14 surrounds the magnets. The band 14 may be placed around the magnets 12 by using any suitable technique and holds the spring members 13, 13 in compressed condition so that they force the magnets apart and into tight engagement with the band.

Figure 4:
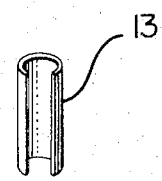
FIG. 4 us a perspective view of a spring element used in the preassembly of FIG. 3.

Once the preassembly 11 of FIG. 3 is formed, it becomes a relatively rigid unit and may be handled relatively roughly without danger of its coming apart. Therefore, the use of the preassembly 11 allows it to be made at one location and to be shipped to another location for assembly with the flywheel or other carrier. These two locations may be different parts of the same factory or may be in the factories of different manufacturers located at widely spaced points in the country. FIG. 4 shows one of the spring member inserts 13 prior to its incorporation into the preassembly 11 of FIG. 3. It will be noted that it consists of a length of generally tubular shaped material having a longitudinal slot therein forming two spaced edges which are moved toward one another as the member is compressed by forces applied to opposite sides of the member in a direction tending to close the slot. As explained in more detail hereinafter, by observing the spacing between the spaced edges of the insert 13 after the inserts are placed in the preassembly 11, the spring forces imposed on the magnets may be roughly estimated and may be used to control the maximum extent of such forces.

Figure 5:
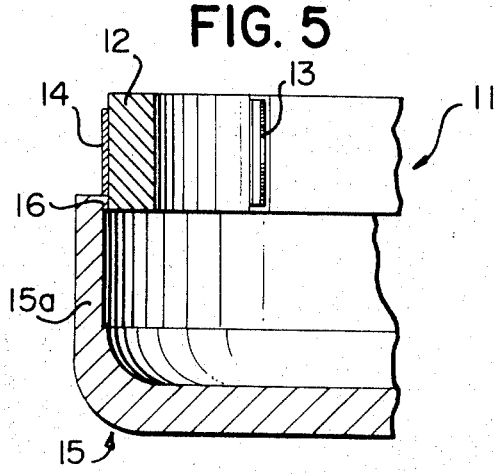
FIG. 5 is a fragmentary sectional view of the magnet preassembly of FIG. 3 positioned for insertion in a flywheel.
Figure 6:
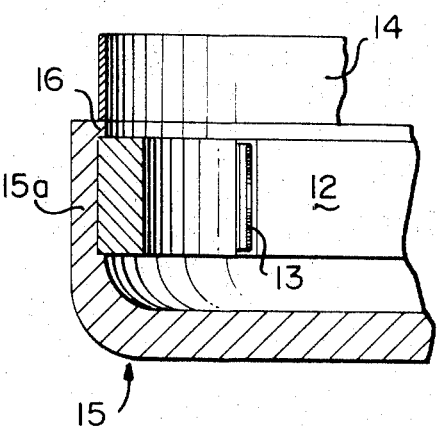
FIG. 6 is similar to FIG. 5 but shows the magnets of FIG. 5 after insertion into the flywheel.

FIGS. 5 and 6 show the method in which the magnets of the preassembly 11 are placed into the flywheel rim 15a. Referring to FIG. 5, the outer faces of the magnets 12, 12 of the preassembly 11 define a circle having a diameter only very slightly less than the internal diameter of the outer or free edge of the rim 15a. Therefore, when assembling the magnets with the rim 15a, the preassembly 11 may be placed as shown in FIG. 5, with the magnets 12, 12 partially entered into the rim 15a and with the band 14 resting on the outer edge of the rim. Thereafter, the magnets may be pushed inwardly relative to the rim 15a by forces applied simultaneously to all of the magnets causing the magnets to slide out of the band 14 and into the rim into their final positions as shown in FIG. 6. As shown in FIGS. 2, 5 and 6, the rim 15a of the flywheel is machined or otherwise formed to provide an undercut lip 16 at its outer edge and to form an annular recess for the magnets 12, 12 which is of a slightly larger diameter than the internal diameter of the rim at the region of the lip 16. Therefore, as the magnets 12, 12 are pushed to their final position and past the undercut lip 16 the spring members 13, 13 will expand the diameter of the magnet ring by forcing the magnets apart from one another causing them to move radially outwardly into the recess of the rim at which position the undercut lip 16 engages the magnets to prevent them from thereafter moving axially out of the rim, or upwardly in FIG. 6. The band 14 is left behind as the magnets are pushed into the flywheel rim and forms no part of the finished rotor assembly.

Figure 7:
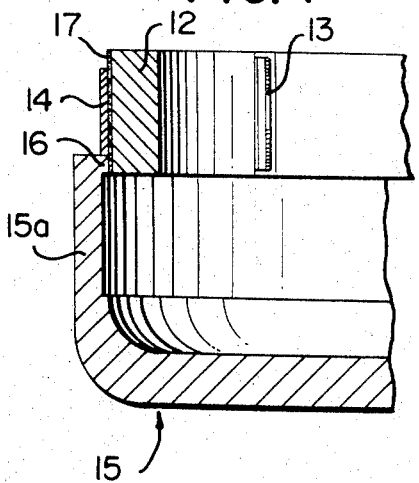
FIG. 7 is a fragmentary view similar to FIG. 5 but showing a magnet preassembly comprising another embodiment of this invention and incorporating an adhesive material.

In the rotor assembly of FIG. 1, the pressure exerted by the spring members 13, 13 against the magnets tends to hold the magnets in place relative to the rim 15a, and the undercut lip 16 adds additional restraint against movement of the magnets axially of the rim. If desired, still further restraint against displacement of the magnets relative to the rim may be provided by bonding the magnets directly to the rim. FIG. 7 is similar to FIG. 5 but shows a magnet preassembly being assembled with the rotor rim 15a and which preassembly also includes a layer 17 of adhesive interposed between the outer face of each magnet and the surrounding band 14. This adhesive material is preferably an epoxy adhesive in a substantially dry state that is applied to the outer face of each magnet prior to its assembly with the spring members 13, 13 and the band 14. After the adhesive coated magnets of FIG. 7 are pushed to their final positions, similar to the positions occupied by the magnets 12, 12 of FIG. 6, the rotor assembly is heated to set the adhesive epoxy material. The assembly is then cooled and the epoxy effects a bond between the magnets and the flywheel rim. The biasing force of the spring elements 13, 13 causes the magnets 12, 12 to be pressed against the flywheel rim during the setting of the adhesive thereby attaining a tight bond therebetween. Once the adhesive material is cured and the bonding between the magnets 12, 12 and the rim 15a is affected, the spring elements 13, 13 may be removed if desired, but it is presently preferred to retain them in the finished rotor. An adhesive material suitable for use in this instance is sold under the tradename "PLASTILOCK" 6L5-4 and comprises a hycar-phenolic base in a methyl ethyl ketone thinner.

An alternative method of bonding the magnets 12, 12 to the flywheel rim 15a is to place the adhesive material on the inside of the rim 15a prior to the insertion of the magnets rather than on the back faces of the magnets. In addition, there is available in the art an epoxy adhesive tape which may be applied to either the magnets or the flywheel rim 15a instead of applying the material in semi-liquid form by methods such as brushing or spraying followed by drying.

Figure 8:
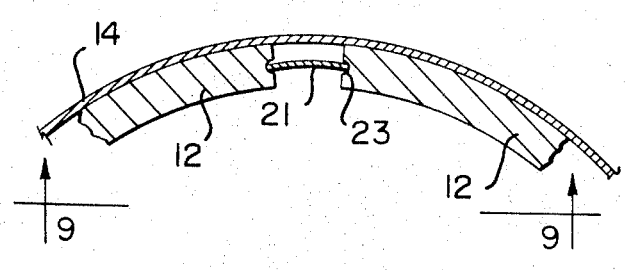
FIG. 8 is a fragmentary sectional view of a magnet preassembly comprising another embodiment of the invention and taken on the line 8—8 of FIG. 9.
Figure 9:
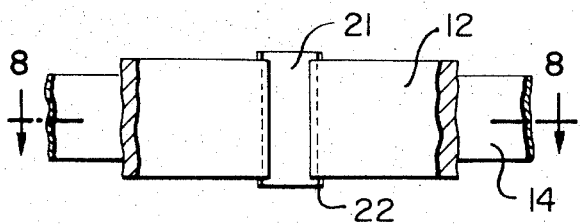
FIG. 9 is a fragmentary elevational view taken on the line 9—9 of FIG. 8.
Figure 10:
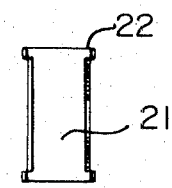
FIG. 10 is a plan view of the spring element shown in FIGS. 8 and 9.

In keeping with the invention, various different types of spring elements or inserts may be used between the magnets 12, 12 in place of the tubular spring elements 13, 13 shown in FIG. 4. FIGS. 8 to 15 show three other different types of spring elements which may be used. In particular, FIGS. 8, 9 and 10 show the use of a spring element 21 between each pair of adjacent magnets 12, 12. The spring element 21 is a bowed piece of spring material and has side edges which are received in grooves 23, 23 formed in the end faces of the adjacent magnets 12, 12. Each spring member 21 further includes lip members 22, 22 at its opposite ends which extend laterally a short distance beyond the magnet engaging side edges and aid in retaining the elements 21, 21 axially in place between the magnets 12, 12.

Figure 11:
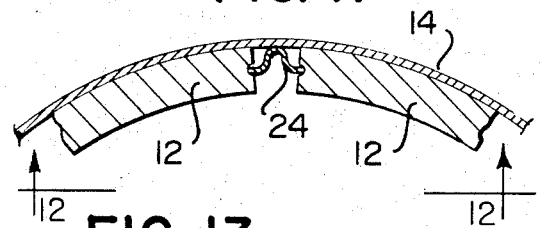
FIG. 11 is a fragmentary sectional view of a magnet assembly comprising another embodiment of the invention and taken on the line 11—11 of FIG. 12.
Figure 12:
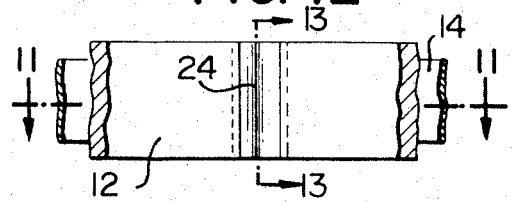
FIG. 12 is a fragmentary elevational view taken on the line 12—12 of FIG. 11.
Figure 13:
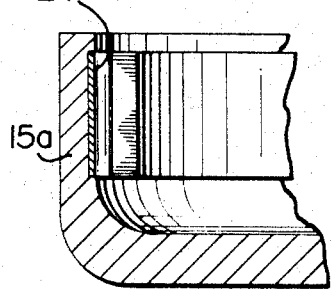
FIG. 13 is a fragmentary sectional view showing the magnets of FIG. 11 positioned in a flywheel, a portion of the section being taken through a spring element on the line 13—13 of FIG. 12.

FIGS. 11, 12 and 13 show the use of an insert 24 between adjacent magnets 12, 12 which insert 24 is of a generally U-shaped cross-section having two end flanges which are received in grooves in the adjacent ends of the magnets 12, 12. The rounded base of the insert 24 engages the band 14 in the preassembly, as shown in FIG. 11, and after the magnets and spring elements are inserted into the flywheel rim 15a, as shown in FIG. 13, the base of the spring element 24 resides under the undercut lip of the rim so that such lip 16 prevents the element from being axially displaced.

Figure 14:
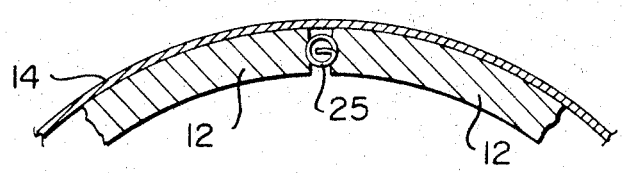
FIG. 14 is a fragmentary sectional view of a magnet preassembly comprising still another embodiment of this invention.
Figure 15:
FIG. 15 is a plan view of the spring element of FIG. 14.

FIGS. 14 and 15 show the use of a helical spring element 25 between adjacent magnets 12, 12 and received in conforming grooves in the end faces of the magnets.

The helical spring element 25 is twisted by applying a torque at opposite ends with some mechanical means prior to and during its insertion between the end faces of the magnets 12, 12. This twisting process reduces its diameter and after insertion between the magnets 12, 12, the twisting force is removed thereby allowing the helical spring member to expand diametrically toward its original diameter and to press against the opposite end faces of the adjacent magnets 12, 12 so as to tend to exert a spreading force thereon tightly pressing the magnets against the surrounding band 14 of the preassembly and against the rim 15a of the final assembly.

Figure 16:
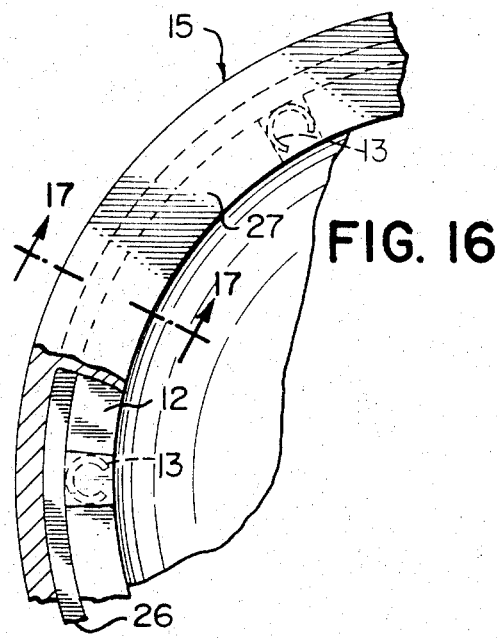
FIG. 16 is a fragmentary end elevational view of a flywheel and magnet assembly comprising another embodiment of this invention, part of the flywheel being shown broken away, to reveal the magnet assembly.
Figure 17:
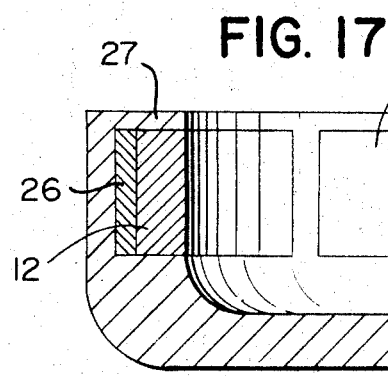
FIG. 17 is a fragmentary sectional view taken on the line 17—17 of FIG. 16.

A magnet assembly generally similar, for example, to the preassembly 11 of FIG. 3 may also be used in association with a flywheel or other carrier made of a non-magnetic material. In this instance, however, the magnet assembly must include some means to provide a low reluctance flux path between the magnetic poles on the outer faces of the magnets. FIGS. 16 and 17 show a flywheel 15 made of non-magnetic material, particularly a die-cast material such as cast-aluminum or aluminum alloy. In this flywheel, the magnets 12, 12 and the spring inserts 13, 13 are die-cast in place. That is, they are embedded in the cast material of the rotor rim 27. In addition, a continuous ring 26 of magnetic material surrounds the magnets 12, 12 and provides the low reluctance flux path between the alternate magnetic poles on the outer faces of the magnets, the ring 26 also being cast in place in the rotor rim 27. The ring 26 of FIGS. 16 and 17 is similar to the band 14 of the preassembly 11 of FIG. 13 except for being of a larger radial dimension and of an axial length substantially equal to the axial length of the magnets 12, 12 so as to overlie the full extent of each outer face of each magnet and provide the low reluctance flux path. The ring 26 may therefore be used in forming the magnets and spring elements into a preassembly. The preassembly is then placed in a suitable mold and the material of the carrier cast around it to form the finished flywheel, the ring 26 in this case remaining with the finished flywheel rather than being removed from the magnets during the final assembly. Of course, the preassembly consisting of the magnets 12, 12, inserts 13, 13 and ring 26 need not necessarily be die-cast in place when used with a non-magnetic rotor material and, if desired, may be otherwise fixed, as for example, by adhesive bonding, to a non-magnetic carrier.

As mentioned previously, the spring inserts placed between the end faces of adjacent magnets to spread the magnets and to hold them in tight assembly with the retaining band of the preassembly may be inserted in any suitable manner. However, some forms of preassemblies lend themselves to a preferred method of assembly carried out in accordance with steps involving a more detailed aspect of this invention and illustrated by FIGS. 18 to 24. Considering first FIG. 18, this figure shows a magnet preassembly in place on a tool 28 for tightening the magnets against the surrounding band 14. This preassembly is different from the one shown in FIG. 3 in that it includes only one spring member 13 placed in one of the gaps between the magnets 12, 12. The other gaps between the magnets 12, 12 are filled with deformable inserts 30, 30 similar to the one shown in FIG. 19. That is, each deformable insert 30 is a length of tube, of aluminum for example, having a generally oval cross-section. The relative sizes of the band 14, the magnets 12, 12, the spring member 13 and the deformable inserts 30, 30 is such that these parts may be readily assembled around the tool 28 by hand with the spring member 13 and inserts 30, 30 being easily manually slipped into place between the magnet end faces. That is, in this initial assembly the spring member 13 is not compressed.

The tool 28 includes a plurality of radially movable rams 29, 29 each located adjacent the position of a respective one of the deformable inserts 30, 30, and after the initial assembly of all of the parts of the preassembly the rams 29, 29 are simultaneously moved radially outwardly and into deforming engagement with the inserts 30, 30. That is, as the rams 29, 29 move radially outwardly, they tend to deform the deformable inserts 30, 30 toward more circular shapes thereby enlarging the gaps in which they are received and spreading the magnets to close the gap containing the spring element 13, thereby compressing the spring element 13. After the deformable inserts 30, 30 are so deformed, the rams 29, 29 are retracted and, thereafter, the compression of the spring insert 13 in cooperation with the now deformed inserts 30, 30 holds the parts of the preassembly in a relatively rigid assembled condition.

Figure 18:
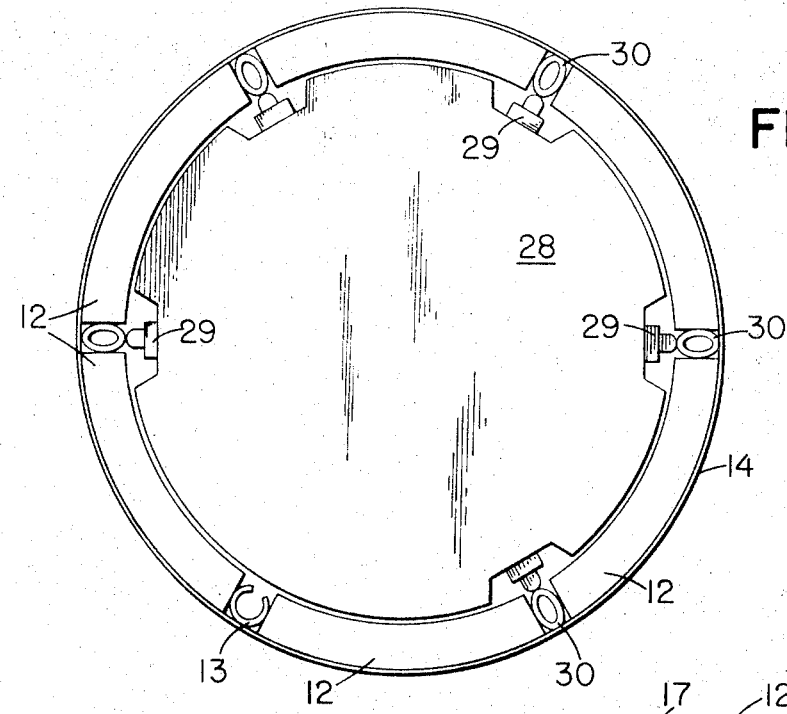
FIG. 18 is an end elevational view of a magnet preassembly comprising still another embodiment of the invention, this view showing the preassembly with the magnets in an initial untightened condition relative to the shipping band and in place on a tool for effecting the tightening.
Figure 19:
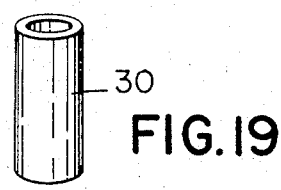
FIG. 19 is a perspective view of one of the deformable inserts used in the magnet preassembly of FIG. 18.
Figure 20:
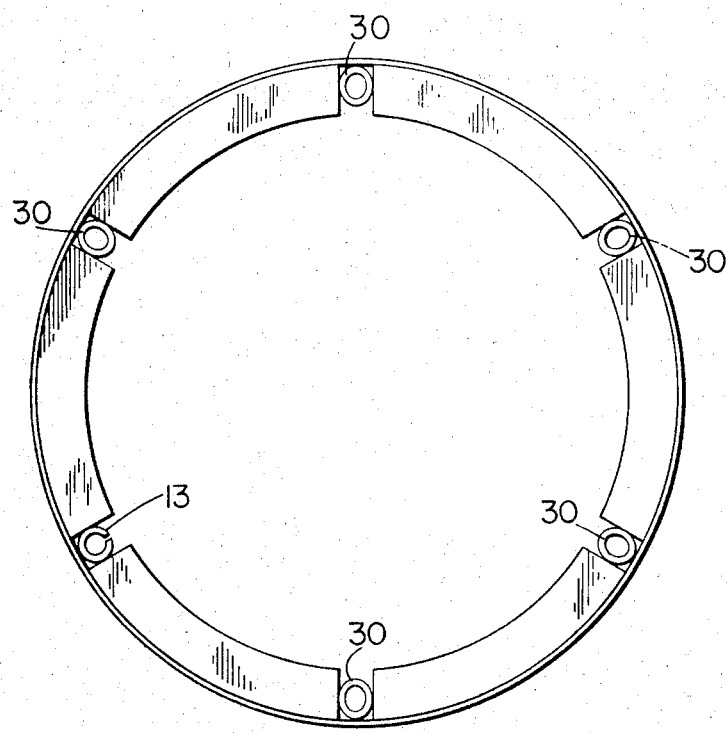
FIG. 20 is an end elevational view of the magnet preassembly of FIG. 18 after tightening.

FIG. 20 shows the preassembly of FIG. 18 removed from the tool 28 and after the deformable members 30, 30 have been deformed to the point the spring member 13 is compressed to an extent sufficient to hold the illustrated parts in assembly with one another. It should be noted that the magnets 12, 12 are subject to cracking or other failure if subjected to too high compressive loads, and the method of assembly illustrated by FIG. 18 provides a method whereby the force imposed on the magnets may be accurately controlled. More particularly, the deformation of the spring member insert 13 provides a gauge of the force imposed on the magnets and by deforming the deformable inserts 30, 30 to provide a predetermined final spacing between the edges of the spring insert 13, a predetermined biasing force may be obtained.

FIGS. 18 and 20 show a preassembly including only one spring element 13 in combination with deformable elements placed in all other gaps of the preassembly. This combination of spring inserts and deformable inserts is, however, not critical and, if desired, the number of spring inserts and deformable inserts may vary. In addition, one or more of the deformable inserts 30, 30 may be replaced by non-deformable inserts and, of course, the exact construction of the deformable inserts may vary from the oval tubular ones shown, the important criterion being that the deformable insert under the influence of radially outwardly directed pressure will deform so as to increase its dimension circumferentially of the preassembly so as to force apart the magnet end faces defining the gap in which it is received.

Figure 22:
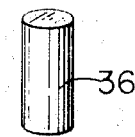
FIG. 22 is a perspective view of one of the nondeformable inserts of FIG. 21.
Figure 21:
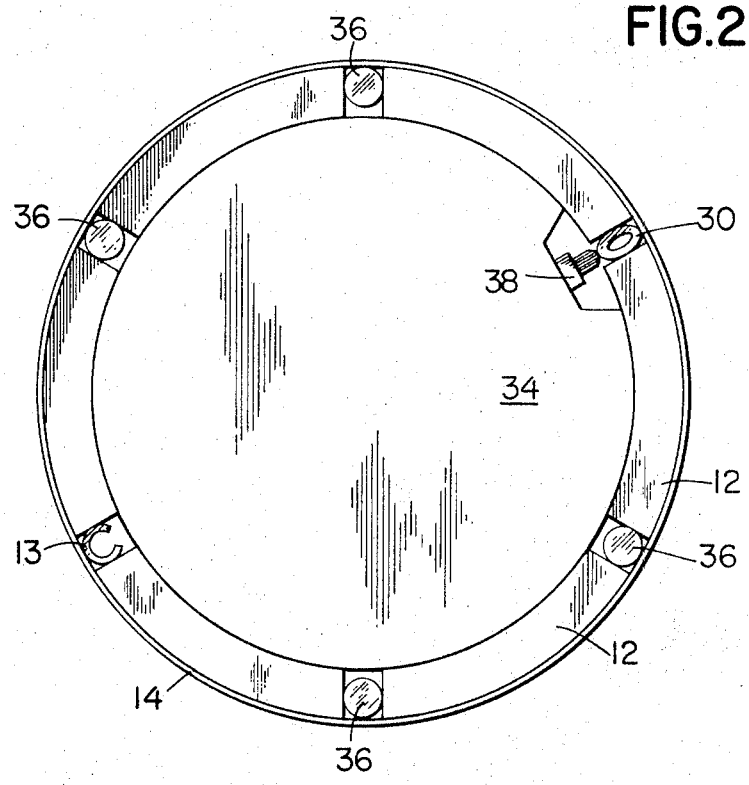
FIG. 21 is a view similar to FIG. 18 but shows a magnet preassembly comprising still another embodiment of the invention.

By way of further example, FIG. 21 shows a magnet preassembly, in place on another forming tool 34 consisting of magnets 12, 12, a surrounding band 14, one spring insert 13, one deformable insert 30 and four non-deformable inserts 36, 36, such as shown in FIG. 22, consisting of short lengths of cylindrical stock. Since there is only one deformable member 30, the tool 34 similarly includes only one radially movable ram 38 for deforming the insert 30 to spread the end faces of the magnets defining the gap in which it is received and to thereby compress the spring 13 to thereafter hold the parts of the preassembly in an assembled condition.

Figure 23:
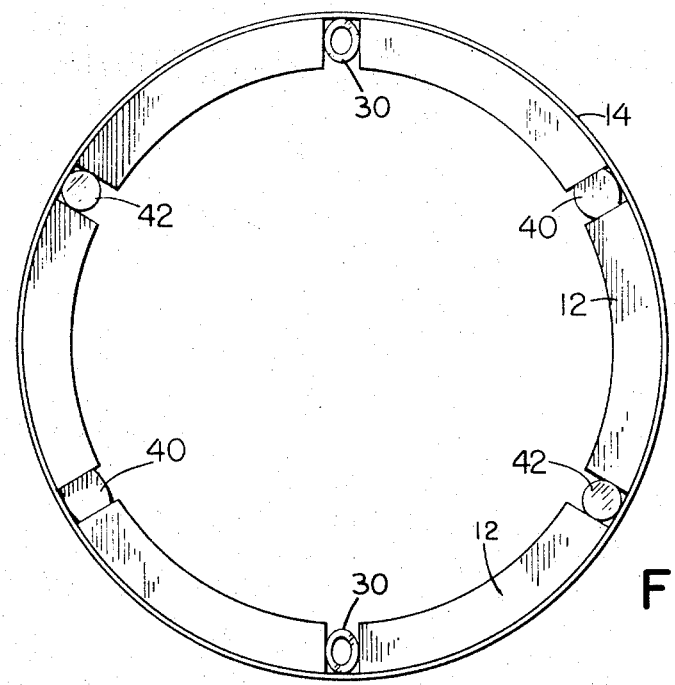
FIG. 23 is an end elevational view of a magnet preassembly comprising another embodiment of the invention.
Figure 24:
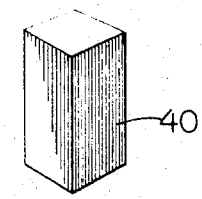
FIG. 24 is a perspective view of one of the resilient inserts of FIG. 23.

FIG. 23 shows still another preassembly consisting of magnets 12, 12, a surrounding band 14, two spring inserts 40, 40, two non-deformable inserts 42, 42 and two deformable inserts 30, 30, this figure showing the preassembly after the deformation of the inserts 30, 30 and the consequent compression of the spring inserts 40, 40. In this case, the spring inserts 40, 40 are comprised of short lengths of rubber or other elastomeric material having, prior to compression, a generally rectangular cross-section as shown in FIG. 24.

Figure 28:
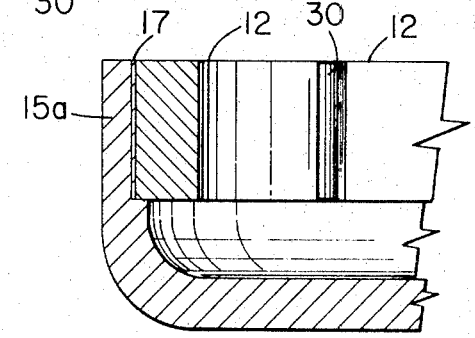
FIG. 28 is a fragmentary sectional view taken on the line 28—28 of FIG. 27.
Figure 27:
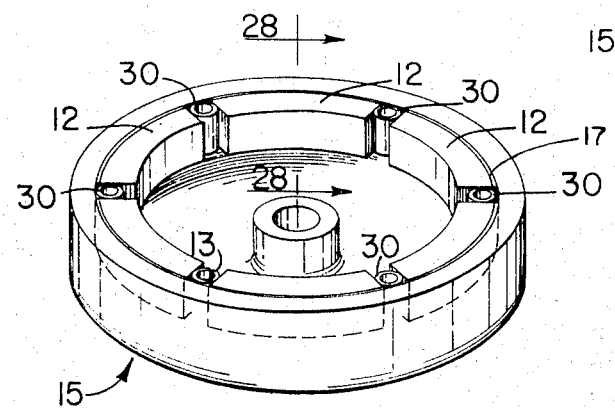
FIG. 27 is a perspective view showing the magnets of FIG. 18 in place in a flywheel.

In the previously illustrated rotors using a magnet assembly combined with a flywheel or other carrier of magnetic material, the magnets after assembly with the carrier have been axially retained in place, not only by the frictional force exerted by the magnets against the inner surface of the carrier or flywheel rim, but by additional means such as the undercut lip 16 of FIG. 2, or the adhesive material 17 of FIG. 7. Such auxiliary means for aiding in holding the magnets axially in place, however, have been found to be unnecessary in many applications. In some instances the undercut lip may be eliminated and adhesive used to aid in retaining the magnets in place. This is illustrated by FIGS. 27 and 28 which show the magnets of FIG. 18 held in place not only by the force of the spring element, but also by an adhesive layer 17 between each magnet and its flywheel rim 15a, the flywheel rim not, however, including an undercut lip.

Figure 25:
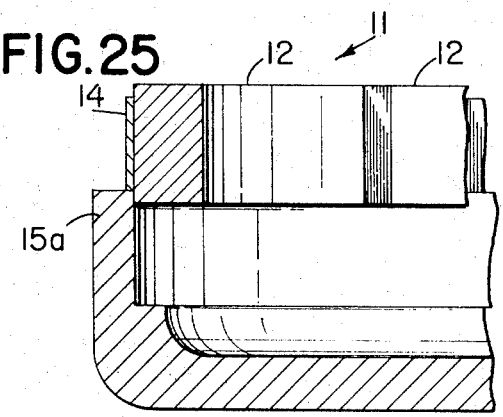
FIG. 25 is a fragmentary sectional view showing the magnet preassembly of FIG. 23 positioned for insertion in a flywheel.
Figure 26:
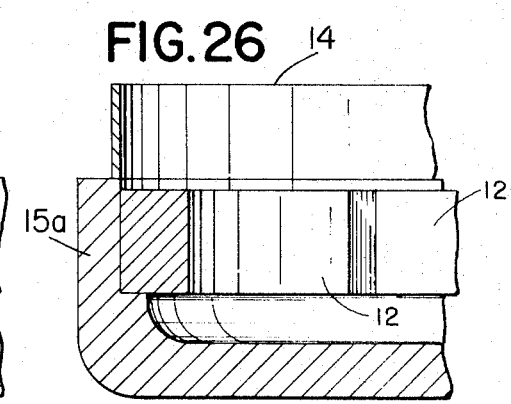
FIG. 26 is a fragmentary sectional view similar to FIG. 25 but showing the magnets in place in the flywheel.

In still some other instances the adhesive may also be eliminated and the force of the spring element or elements alone used to retain the magnets in the final assembly. In fact, if the spring elements used to hold the magnets in place are properly designed and held in properly compressed states in the finished assembly, extremely large forces may be required to thereafter displace the magnets from the flywheel or other carrier into which they are placed. FIGS. 25 and 26 show the assembly of a magnet preassembly 11 with a flywheel in a situation wherein the magnets are to be held in place solely by the force exerted thereon by spring element or elements. The rotor rim 15a of FIGS. 25 and 26 is similar to that shown in FIG. 2 except for not including any undercut lip. Therefore, as the magnets 12, 12 of the preassembly are moved from the position shown in FIG. 25 into the rim to the position shown in FIG. 26, they do not substantially change in diameter and are merely brought by such movement to the FIG. 26 position into permanent engagement with the interior surface of the rotor rim 15a. In connection with this method of assembly, the preassembly 11 is preferably one including one or more deformable members, such as the preassembly shown in FIGS. 18 and 20, and in making the preassembly the deformable member or members are deformed only to the extent necessary to slightly compress the spring member or members to create only a low degree of force holding the parts in assembly and sufficient only to resist disassembly by normal handling and shipping loads. This, therefore, keeps to a minimum the forces necessary to push the magnets from the FIG. 25 position to the FIG. 26 position when inserting them into a flywheel or other carrier. Then, after the magnets are in position in the flywheel or other carrier, the deformable member or members are further deformed, by a suitable tool such as the tool 28 of FIG. 18, to further compress the spring member or members and to thereby increase the forces holding the magnets in the carrier.

Figure 29:
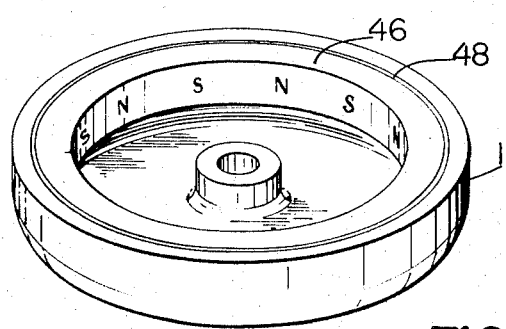
FIG. 29 is a perspective view showing a flywheel and a one-piece magnet assembly comprising still another embodiment of this invention.

Also, as previously mentioned, one aspect of this invention is the fact that the magnets used in the rotor are made of a ceramic material and are so designed that when magnetized more than one magnetic pole may be formed on the inner face of each magnet. As a limiting situation, the magnet ring may be composed of a single annular one-piece magnet charged to provide alternate poles on its inner face. Such a construction is shown in FIG. 29 wherein the magnet is shown to consist of a circular member 46 made of ceramic permanent magnet material and inserted into the rim 15a of the flywheel. The ring magnet 46 is held in place in the flywheel rim 15a by a layer of adhesive 48 and after insertion into the flywheel is magnetized to produce alternate magnetic poles on its inner face as shown.

Figure 30:
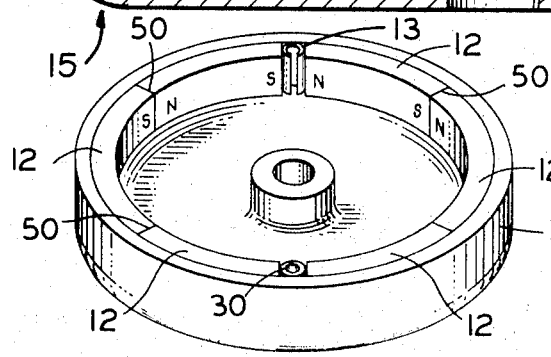
FIG. 30 is a perspective view similar to FIG. 29 but showing another embodiment of the invention.

It will also be appreciated that in cases where the magnet ring is made from a plurality of magnets there need not in all instances be inserts placed between each pair of adjacent magnet end faces. Instead, it is possible to allow some pairs of adjacent end faces to abut one another without placing inserts therebetween. For example, FIG. 30 shows a rotor containing a magnet ring comprised of a plurality of magnets 12, 12 wherein such magnets have end faces which abut one another at the places indicated at 50, 50, there being only two gaps in the magnet ring. One of these gaps receives a deformable member 30 and the other receives a spring member 13. Of course, if some means other than a deformable insert is used to obtain compression of the spring member during assembly, even the deformable member 30 of FIG. 30 may be eliminated and the rotor made with only one gap between the magnets which gap is filled with a spring member such as the member 13.

I claim:

1. A method of making an assembly of magnets for a dynamoelectric machine, said method comprising the steps of: forming an initial assembly of parts consisting of an annular part, an annular arrangement of generally arcuately shaped permanent magnets located within said annular part in a generally end face to end face relationship to provide pairs of adjacent end faces and with at least some of said pairs of adjacent end faces being spaced from one another to provide gaps between adjacent magnets, and a plurality of inserts each received in a respective one of said gaps, said inserts including at least one resilient biasing member and at least one deformable member, and thereafter deforming said deformable member in such a manner as to increase its dimension circumferentially of said annular part so as to spread apart the magnets forming the gap in which it is received and compressing said resilient member to cause said magnets to be thereafter tightly held against said annular part by the force exerted thereon by said resilient member.

2. The method defined in claim 1 wherein said deformable member is one which is deformable to increase its dimension circumferentially of said annular part by a force applied thereto directed radially outwardly of said annular part and wherein said step of deforming said deformable member is accomplished by applying to said deformable member a force directed radially outwardly of said annular part.

3. The method defined in claim 1 further characterized by providing said annular part in the form of an annular band, and providing a carrier of magnetic material having an axially extending rim with an internal diameter at the outer edge of said rim approximately equal to the internal diameter of said band, placing said annular arrangement of magnets over said rim with said band resting on said rim, and thereafter applying forces simultaneously to all of said magnets to push them axially out of said band and into said rim.

4. The method defined in claim 3 further characterized by further deforming said deformable member after said magnets are received in said rim to further compress said resilient member and to thereby cause said magnets to be more tightly held against said rim.

5. The method defined in claim 3 further characterized by making said magnets of an oriented ferrite material, and after said magnets are received in said rim magnetizing them to provide a plurality of angularly spaced magnetic poles on the radially inner face of each magnet.

6. The method defined in claim 1 further characterized by providing said annular part in the form of an annular band of magnetic material of such a size as to provide a low reluctance flux path between magnetic poles formed on the radially outer faces of said magnets, and casting non-magnetic material about said assembly to form a rotor with a rim of such non-magnetic material having embedded therein said magnets, said inserts and said annular band.

7. The method defined in claim 6 further characterized by making said magnets of an oriented ferrite material, and after said magnets are embedded in said rim magnetizing them to provide a plurality of angularly spaced magnetic poles on the radially inner face of each magnet.

8. A method for making a field means for a dynamo-electric machine, said method comprising the steps of: providing a part having an annular inwardly facing surface, placing a plurality of generally arcuately shaped permanent magnets within said annular surface in a generally end face to end face relationship to provide pairs of adjacent end faces with at least some of said pairs of adjacent end faces being spaced from one another to provide gaps between adjacent magnets, placing a resilient biasing member in one of said gaps, placing a non-resiliently deformable member in another of said gaps, and thereafter deforming said non-resiliently deformable member to increase its dimension circumferentially of said annular surface so as to spread apart the magnets forming the gap in which it is received and to thereby compress said resilient member to cause said magnets and said members to be held in a self-sustaining assembly with said part.

9. The method of making a field means for a dynamo-electric machine as defined in claim 8 further characterized by providing said magnets in a de-magnetized condition prior to assembly with said part, and magnetizing said magnets subsequent to their assembly with said part.

10. A method for making a field means for a dynamo-electric machine as defined in claim 8 further characterized by providing said non-resiliently deformable member in the form of a tubular member having a generally oval cross-section, said non-resiliently deformable member in said step of placing it in its gap being placed with its longitudinal axis generally parallel to the axis of said annular surface and with the major axis of its generally oval cross-section oriented generally radially of said annular surface, and said step of deforming said resiliently deformable member being accomplished by applying to it a force directed radially outwardly of said annular surface so as to deform said deformable member toward a more circular shape.

11. A method for making a field means for a dynamo-electric machine as defined in claim 8 further characterized by placing a non-deformable member in another of said gaps before deforming said non-resiliently deformable member.

* * * * *